US012518626B2

(12) United States Patent
Komiyama

(10) Patent No.: US 12,518,626 B2
(45) Date of Patent: Jan. 6, 2026

(54) TRAVELING VEHICLE SYSTEM

(71) Applicant: MURATA MACHINERY, LTD., Kyoto (JP)

(72) Inventor: Yoshiyuki Komiyama, Ise (JP)

(73) Assignee: MURATA MACHINERY, LTD., Kyoto (JP)

( * ) Notice: Subject to any disclaimer, the term of this patent is extended or adjusted under 35 U.S.C. 154(b) by 271 days.

(21) Appl. No.: 18/113,208

(22) Filed: Feb. 23, 2023

(65) Prior Publication Data
US 2023/0282108 A1 Sep. 7, 2023

(30) Foreign Application Priority Data

Mar. 7, 2022 (JP) ................................. 2022-034269

(51) Int. Cl.
*G08G 1/0967* (2006.01)
*G08G 1/01* (2006.01)
*G08G 1/052* (2006.01)

(52) U.S. Cl.
CPC ..... *G08G 1/096733* (2013.01); *G08G 1/0133* (2013.01); *G08G 1/0145* (2013.01); *G08G 1/052* (2013.01)

(58) Field of Classification Search
CPC ........... G08G 1/096733; G08G 1/0133; G08G 1/0145; G08G 1/052; G05D 1/0297; G05D 1/0289; B65G 35/00; B65G 43/00; B65G 43/10; B65G 2203/0266; B65G 2203/041
See application file for complete search history.

(56) References Cited

U.S. PATENT DOCUMENTS

| 2003/0173173 | A1* | 9/2003 | Stephan | ................ B60L 15/005 191/10 |
| 2007/0016366 | A1* | 1/2007 | Nagasawa | ............ G05D 1/0223 701/413 |
| 2014/0034786 | A1 | 2/2014 | Fujioka | |
| 2019/0318950 | A1 | 10/2019 | Takahara | |
| 2021/0253108 | A1* | 8/2021 | Ito | ................... B60W 30/18163 |

FOREIGN PATENT DOCUMENTS

JP 2013-020423 A 1/2013

* cited by examiner

*Primary Examiner* — Dylan M Katz
(74) *Attorney, Agent, or Firm* — Keating & Bennett, LLP

(57) ABSTRACT

A traveling vehicle system, in a merging area including a merging point, until a traveling vehicle traveling on one travel route passes through the merging area, stops a traveling vehicle traveling on another travel route at a stop point before the merging point. The traveling vehicle system calculates a required time for a first traveling vehicle passing through the merging point to pass through the merging area and, when a second traveling vehicle following the first traveling vehicle and traveling on the same travel route as the first traveling vehicle outside the merging area is capable of entering the merging area within the required time, causes the second traveling vehicle to enter the merging area without decelerating the second traveling vehicle to a speed limit or less enabling stopping at the stop point.

3 Claims, 4 Drawing Sheets

TRAVELING VEHICLE SYSTEM

CROSS REFERENCE TO RELATED APPLICATIONS

This application claims the benefit of priority to Japanese Patent Application No. 2022-034269 filed on Mar. 7, 2022. The entire contents of this application are hereby incorporated herein by reference.

BACKGROUND OF THE INVENTION

1. Field of the Invention

An aspect of the present invention relates to a traveling vehicle system.

2. Description of the Related Art

A traveling vehicle system is known to perform control (blocking control), in a merging area including a merging point of a plurality of travel routes, until a traveling vehicle traveling on one travel route passes through the merging area, to stop a traveling vehicle traveling on another travel route at a stop point before the merging point (refer to Japanese Unexamined Patent Publication No. 2013-20423, for example).

SUMMARY OF THE INVENTION

In the traveling vehicle system described above, considering the possibility of stopping the traveling vehicle at the stop point, before the traveling vehicle enters the merging area, the traveling vehicle may be decelerated to a speed limit or less enabling stopping at the stop point. In this case, however, the traveling vehicle is decelerated even when there are no other traveling vehicles in the merging area, and thus a travel time may be unnecessarily extended.

Preferred embodiments of the present invention provide traveling vehicle systems that can each prevent a travel time from being extended.

A traveling vehicle system according to an aspect of a preferred embodiment of the present invention is a traveling vehicle system to perform control, in a merging area including a merging point of a plurality of travel routes, until a traveling vehicle traveling on one travel route passes through the merging area, to stop a traveling vehicle traveling on another travel route at a stop point before the merging point, the traveling vehicle system being configured or programmed to calculate a required time for a first traveling vehicle passing through the merging point in the merging area to pass through the merging area and, when a second traveling vehicle following the first traveling vehicle and traveling on the same travel route as the first traveling vehicle outside the merging area is capable of entering the merging area within the required time, cause the second traveling vehicle to enter the merging area without decelerating the second traveling vehicle to a speed limit or less enabling stopping at the stop point.

In this traveling vehicle system, until the first traveling vehicle traveling through the merging area passes through the merging area, another traveling vehicle (hereinafter, referred to as an "opposite traveling vehicle") traveling on a different travel route from the first traveling vehicle is prohibited from entering the merging point. In such a prohibited condition, when the second traveling vehicle traveling on the same travel route as the first traveling vehicle can enter the merging area (that is, when it can enter the merging area within the required time), there is no risk of the second traveling vehicle coming into contact with the opposite traveling vehicle at the merging point (the opposite traveling vehicle entering the merging point), and thus there is no need to decelerate the second traveling vehicle to the speed limit or less, and the second traveling vehicle can be caused to enter the merging area at a high speed, for example. Thus, an aspect of a preferred embodiment of the present invention can prevent the travel time from being extended.

A traveling vehicle system according to an aspect of a preferred embodiment of the present invention may include an information output provided in a traveling vehicle to output information on the required time to another traveling vehicle following the traveling vehicle, and an information input provided in a traveling vehicle to receive input of the information on the required time from another traveling vehicle preceding the traveling vehicle. In this case, the information on the required time can be directly exchanged between the traveling vehicles.

In a traveling vehicle system according to an aspect of a preferred embodiment of the present invention, the information output may include a display, and the information input may include a camera or photo sensor. In this case, even in an environment in which wireless communication or the like is difficult, the information on the required time can be exchanged between the traveling vehicles.

In a traveling vehicle system according to an aspect of a preferred embodiment of the present invention, the second traveling vehicle is decelerated to the speed limit or less when the second traveling vehicle is not capable of entering the merging area within the required time. With this deceleration, when there is a possibility of the opposite traveling vehicle entering the merging point, taking into account the possibility of stopping the second traveling vehicle at the stop point, the second traveling vehicle can be decelerated to the speed limit or less.

In a traveling vehicle system according to an aspect of a preferred embodiment of the present invention, the merging area may correspond to an induction line area provided with induction lines along the travel routes around the merging point. In this case, the induction line area can be utilized as the merging area.

Aspects of preferred embodiments of the present invention can provide traveling vehicle systems that can each prevent the travel time from being extended.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following describes preferred embodiments of the present invention in detail with reference to the accompanying drawings. In the description of the drawings, identical or equivalent elements are denoted by the same symbols, and redundant descriptions are omitted.

Figure 1:
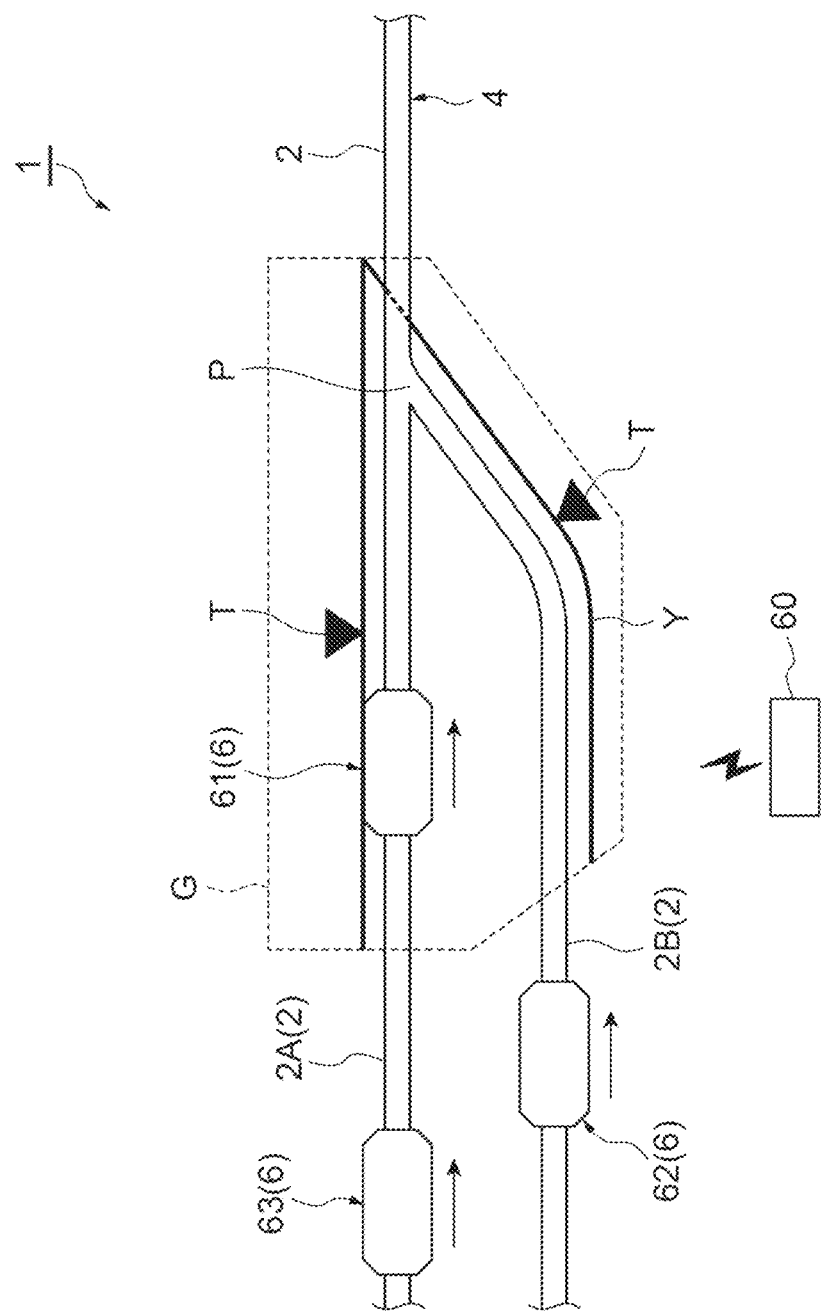
FIG. 1 is a schematic configuration diagram illustrating a traveling vehicle system according to a preferred embodiment of the present invention.

As illustrated in FIG. 1, a traveling vehicle system 1 is a system to transport articles 10 using traveling vehicles 6 that can move along a track 4. The articles 10 include containers such as front opening unified pods (FOUPs) storing a plurality of semiconductor wafers and reticle pods storing glass substrates, and general components, for example. The following describes the traveling vehicle system 1 in which the traveling vehicles 6 travel along the one-way track 4 laid on the ceiling of a factory or the like as an example. In the following, the words "front" and "rear" correspond to the front and rear of the travel direction of the traveling vehicles 6, whereas the words "above" and "below" correspond to above and below in the vertical direction.

Figure 2:
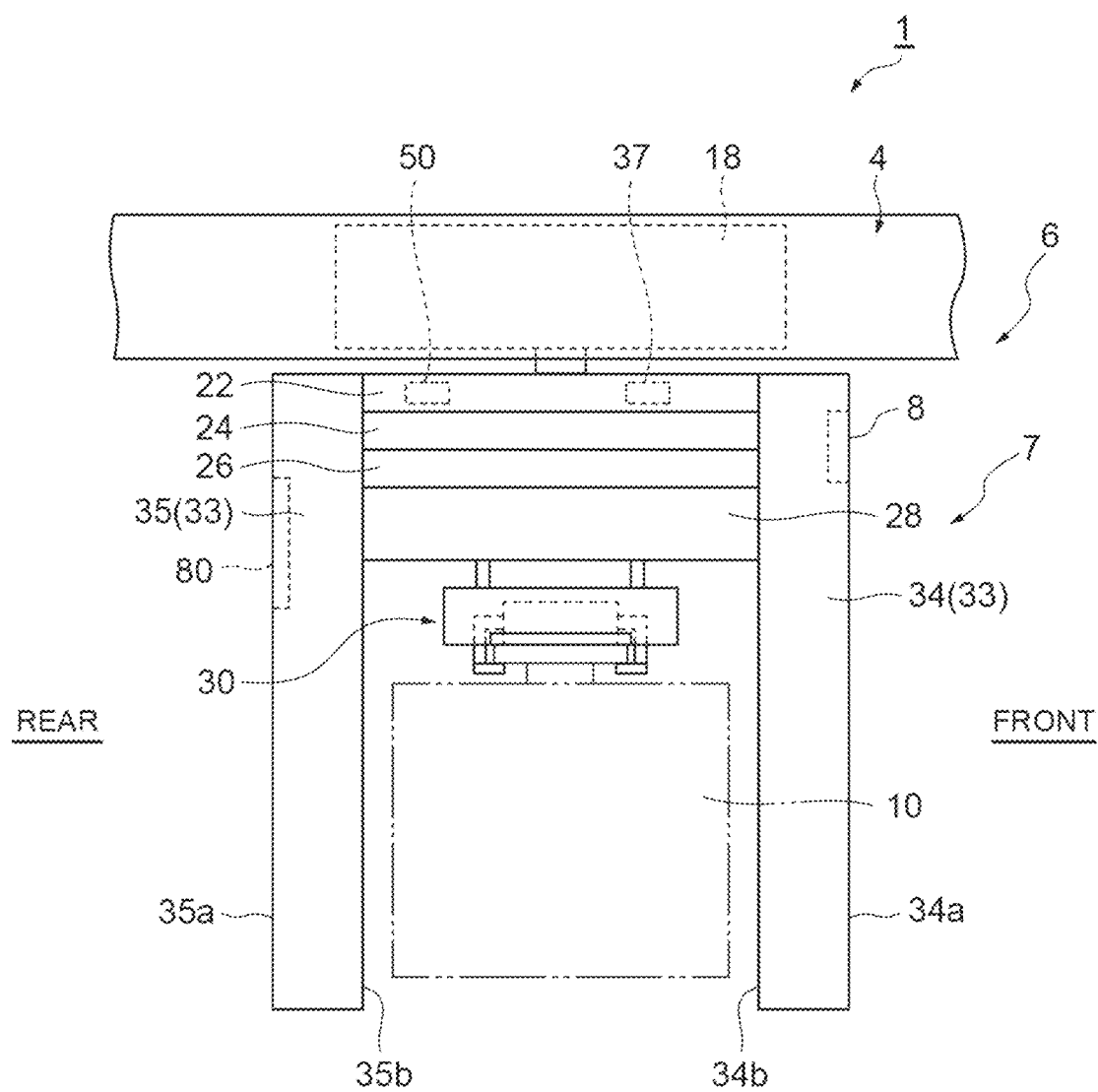
FIG. 2 is a side view illustrating a traveling vehicle.
Figure 3:
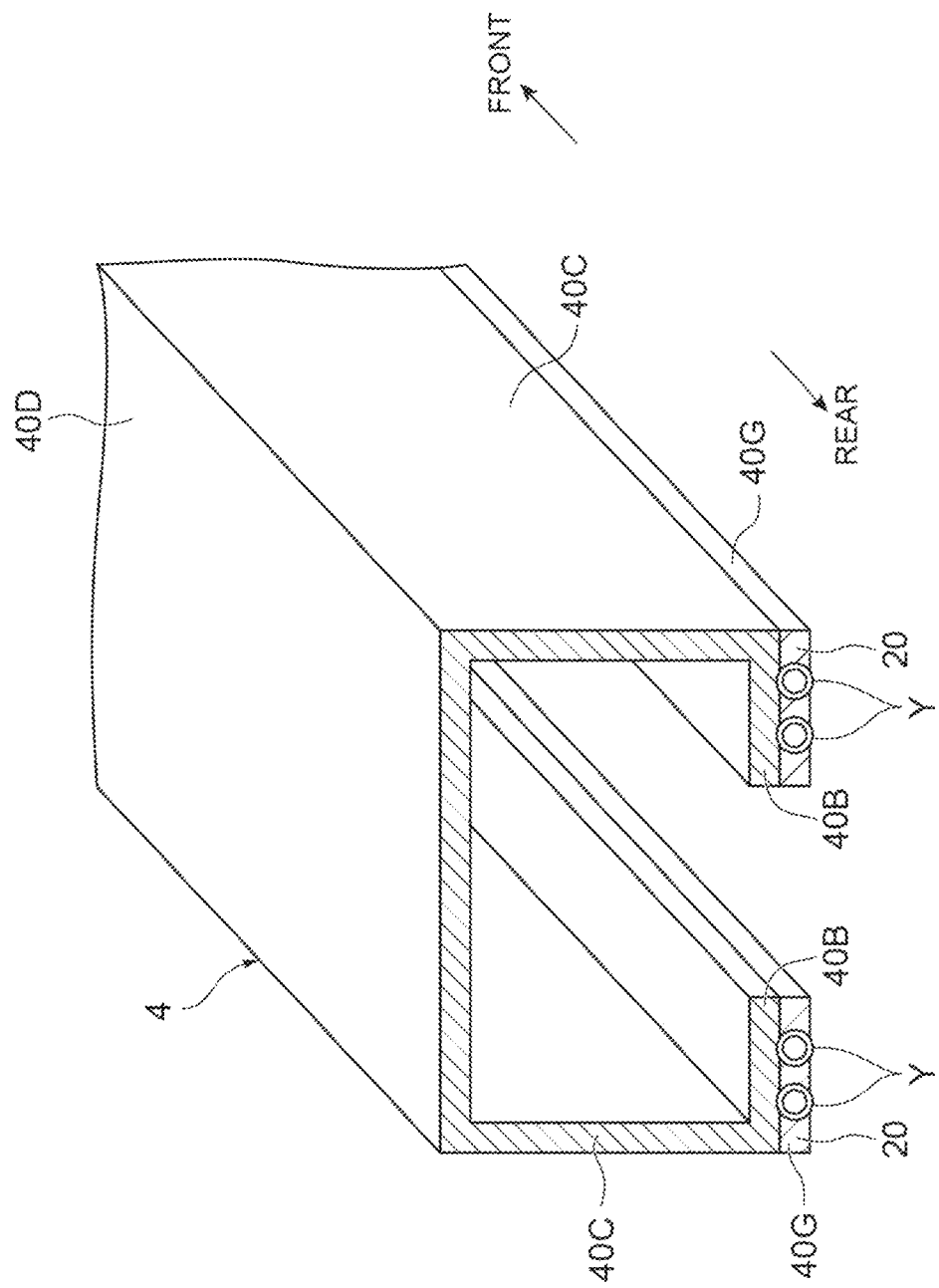
FIG. 3 is a sectional perspective view illustrating a track and induction lines.

The traveling vehicle system 1 includes the track 4, the plurality of traveling vehicles 6, and a controller 60. As illustrated in FIG. 2 and FIG. 3, the track 4 is laid near the ceiling, which is overhead space of an operator, for example. The track 4 is suspended from the ceiling, for example. The track 4 is a predetermined travel path on which the traveling vehicles 6 travel. The track 4 includes a tubular rail main body including a pair of lower surface portions 40B, a pair of side surface portions 40C and 40C, and a top surface part 40D. Induction line plates 40G are fixed to the lower surface portions 40B (the lower portion of the track 4).

The induction line plates 40G are plate-shaped sensors with induction lines Y built therein. The induction lines Y communicate with induction cores 37, which are described below, of the traveling vehicle 6. The induction lines Y are loop-shaped communication lines (conductor lines). The induction lines Y are used to determine which of the traveling vehicles 6 will pass through a merging point P first in a merging area G (refer to FIG. 1) of the track 4, for example.

As illustrated in FIG. 1, the track 4 includes a plurality of travel routes 2. The travel routes 2 (in this case, travel routes 2A and 2B) merge with each other via the merging point P in the merging area G. The merging area G is an area including the merging point P. The merging area G corresponds to an induction line area provided with the induction lines Y along the travel routes 2 around the merging point P.

As illustrated in FIG. 1 and FIG. 2, the traveling vehicles 6 travel along the track 4 to transport the articles 10. The traveling vehicle 6 is configured to transfer the articles 10. The traveling vehicle 6 is an Overhead Hoist Transport. The number of the traveling vehicles 6 provided by the traveling vehicle system 1 is not limited to a particular number, which is a plurality. The traveling vehicle 6 includes a traveler 18, a main body 7, an indicator (a display) 80, an imager 8, and a controller 50.

The traveler 18 includes a motor or the like to cause the traveling vehicle 6 to travel along the track 4. The main body 7 includes a center frame 22, a cross-feed 24, a θ drive 26, a lifting-and-lowering driver 28, a lifting-and-lowering elevator 30, a main body cover 33, and the induction cores 37. The center frame 22 supports the cross-feed 24, the θ drive 26, the lifting-and-lowering driver 28, and the lifting-and-lowering elevator 30. The cross-feed 24 collectively feeds the θ drive 26, the lifting-and-lowering driver 28, and the lifting-and-lowering elevator 30 laterally in a direction perpendicular to the travel direction of the track 4. The θ drive 26 rotates at least either the lifting-and-lowering driver 28 or the lifting-and-lowering elevator 30 within a certain angular range in the horizontal plane. The lifting-and-lowering driver 28 lifts and lowers the lifting-and-lowering elevator 30 by winding and paying out suspending materials such as wires, ropes, and belts. The lifting-and-lowering elevator 30 is provided with a chuck, which can freely grasp or release the article 10.

The main body cover 33 is provided at the front and the rear of the traveling vehicle 6 each. The main body cover 33 causes claws or the like, not illustrated, to protrude or retract to prevent the article 10 from falling during transport. The main body cover 33 includes a front cover 34 provided on the front side of the travel direction of the traveling vehicle 6 and a rear cover 35 provided on the rear side thereof. The front cover 34 preferably has a substantially isosceles trapezoidal shape in a plan view when viewed from above and mainly has a front surface 34a facing outward (frontward) and a rear surface 34b facing inward (rearward) where the lifting-and-lowering elevator 30 is provided. The rear cover 35 preferably has a substantially isosceles trapezoidal shape in a plan view when viewed from above and has a rear surface 35a facing outward (rearward) and a front surface 35b facing inward (frontward) where the lifting-and-lowering elevator 30 is provided. The induction cores 37 are provided in pairs in the center frame 22. The induction cores 37 transmit and receive signals via the induction lines Y of the induction line plates 40G.

The indicator 80 is provided in a switchable manner between a lit state and a non-lit state. The light source of the indicator 80 is an LED lamp, a halogen lamp, a fluorescent lamp, an incandescent lamp, and the like. Lighting control in each area is performed by the controller 50. The indicator 80 displays and outputs display about required time information, which is described below, to another traveling vehicle 6 following a predetermined traveling vehicle 6 on the same travel route 2 as the predetermined traveling vehicle 6. The indicator 80 corresponds to an information output to output the required time information to the second traveling vehicle 6 following the predetermined traveling vehicle 6.

The imager 8 is provided on the front surface 34a of the front cover 34 of the main body 7 so that the imaging range corresponds to the front of the predetermined traveling vehicle 6. The imager 8 includes a camera or photo sensor including a lens, an imaging converter to convert light entering from the lens into an electric signal, and the like. The imager 8, in such a manner that the indicator 80 of another traveling vehicle 6 (a first traveling vehicle: hereinafter, also referred to as a "preceding traveling vehicle 61") preceding the predetermined traveling vehicle 6 on the same travel route 2 as the predetermined traveling vehicle 6 is included in a taken image, takes an image of the preceding traveling vehicle 61. The imager 8 takes a taken image including the display about the required time information. The imager 8 corresponds to an information input to receive input of the required time information from the preceding traveling vehicle 61.

The controller 50 is an electronic control unit including a central processing unit (CPU), a read only memory (ROM), and a random access memory (RAM). The controller 50 is configured or programmed to control various operations in the traveling vehicle 6. Specifically, the controller 50 is configured or programmed to control the traveler 18, the cross-feed 24, the θ drive 26, the lifting-and-lowering driver 28, the lifting-and-lowering elevator 30, the indicator 80, and the imager 8. The controller 50 can be configured as software in which a computer program stored in the ROM is loaded onto the RAM and is executed by the CPU, for example. The controller 50 may be configured as hardware including electronic circuitry or the like. The controller 50 performs wired communication or wireless communication with the controller 60.

The controller 50, when the predetermined traveling vehicle 6 enters the merging area G, performs communication via the induction lines Y by the induction cores 37 to determine whether another traveling vehicle 6 (hereinafter, referred to as an "opposite traveling vehicle 62") traveling on the travel route 2 different from the travel route 2 on which the predetermined traveling vehicle 6 travels is present in the merging area G.

When determining that the opposite traveling vehicle 62 is present in the merging area G (that is, if the predetermined traveling vehicle 6 enters the merging area G after the opposite traveling vehicle 62), the controller 50 performs blocking control to decelerate the predetermined traveling vehicle 6 and stop the predetermined traveling vehicle 6 at a stop point T. The stop point T is a point before the merging point P set in advance. The stop point T is not limited to a particular point and may be set at any point. On the other hand, when determining that the opposite traveling vehicle 62 is not present in the merging area G (that is, if the predetermined traveling vehicle 6 enters the merging area G before the opposite traveling vehicle 62), the controller 50 does not stop the predetermined traveling vehicle 6 at the stop point T, but causes the predetermined traveling vehicle 6 to pass through the merging point P. That is, the traveling vehicle system 1 performs control, until the traveling vehicle 6 traveling on one travel route 2 passes through the merging area G, to stop the traveling vehicle 6 traveling on another travel route 2 at the stop point T.

In the present preferred embodiment, the controller 50, when the predetermined traveling vehicle 6 passes through the merging point P in the merging area G (does not stop at the stop point T), calculates a required time for the predetermined traveling vehicle 6 to pass through (exit) the merging area G. The controller 50 calculates a required time for the predetermined traveling vehicle 6 to pass through the merging area G fastest based on information on the current speed and current position of the predetermined traveling vehicle 6, map information on the travel route 2, and various other information, for example. The controller 50 controls the indicator 80 to cause the indicator 80 to display the required time information regarding the calculated required time. In other words, the controller 50 causes the required time information to be output to the other traveling vehicle 6 following the predetermined traveling vehicle 6. The display mode in the indicator 80 is not limited to a particular mode. It may be various modes so long as it is a mode about the required time information.

The controller 50, when imaging the display about the required time information displayed on the indicator 80 of the preceding traveling vehicle 61 by the imager 8, acquires the required time information from the taken image. The controller 50 performs image recognition processing on the taken image of the imager 8 and can acquire the required time information from the result of image recognition processing, for example. The image recognition processing is not limited to particular processing, and various known image recognition processing can be used.

The controller 50, when acquiring the required time information of the preceding traveling vehicle 61 before the predetermined traveling vehicle 6 enters the merging area G, determines whether the predetermined traveling vehicle 6 can enter the merging area G within the required time. The controller 50, if the time for the predetermined traveling vehicle 6 to reach the merging area G is shorter than the required time of the required time information, determines that the predetermined traveling vehicle 6 can enter the merging area G. In determining whether the predetermined traveling vehicle 6 can enter the merging area G within the required time, it may be determined on the assumption that the predetermined traveling vehicle 6 will accelerate.

The controller 50, when determining that the predetermined traveling vehicle 6 can enter the merging area G within the required time, causes the predetermined traveling vehicle 6 to enter the merging area G without decelerating to the speed limit or less to make the predetermined traveling vehicle 6 follow the preceding traveling vehicle 61. On the other hand, the controller 50, when determining that the predetermined traveling vehicle 6 cannot enter the merging area G within the required time, decelerates the predetermined traveling vehicle 6 to the speed limit or less before the predetermined traveling vehicle 6 enters the merging area G. The speed limit is a speed at which the traveling vehicle 6 can be stopped at the stop point T. The speed limit is an upper limit speed at which the traveling vehicle 6 can be stopped at the stop point T when entering the merging area G, specified based on the deceleration performance of the traveling vehicle 6, for example.

The controller 60 is an electronic control unit including the CPU, the ROM, and the RAM. The controller 60 can be configured as software in which a computer program stored in the ROM is loaded onto the RAM and is executed by the CPU, for example. The controller 60 may be configured as hardware including electronic circuitry or the like. The controller 60 transmits a transport command to transport the article 10 to the traveling vehicle 6.

Figure 4:
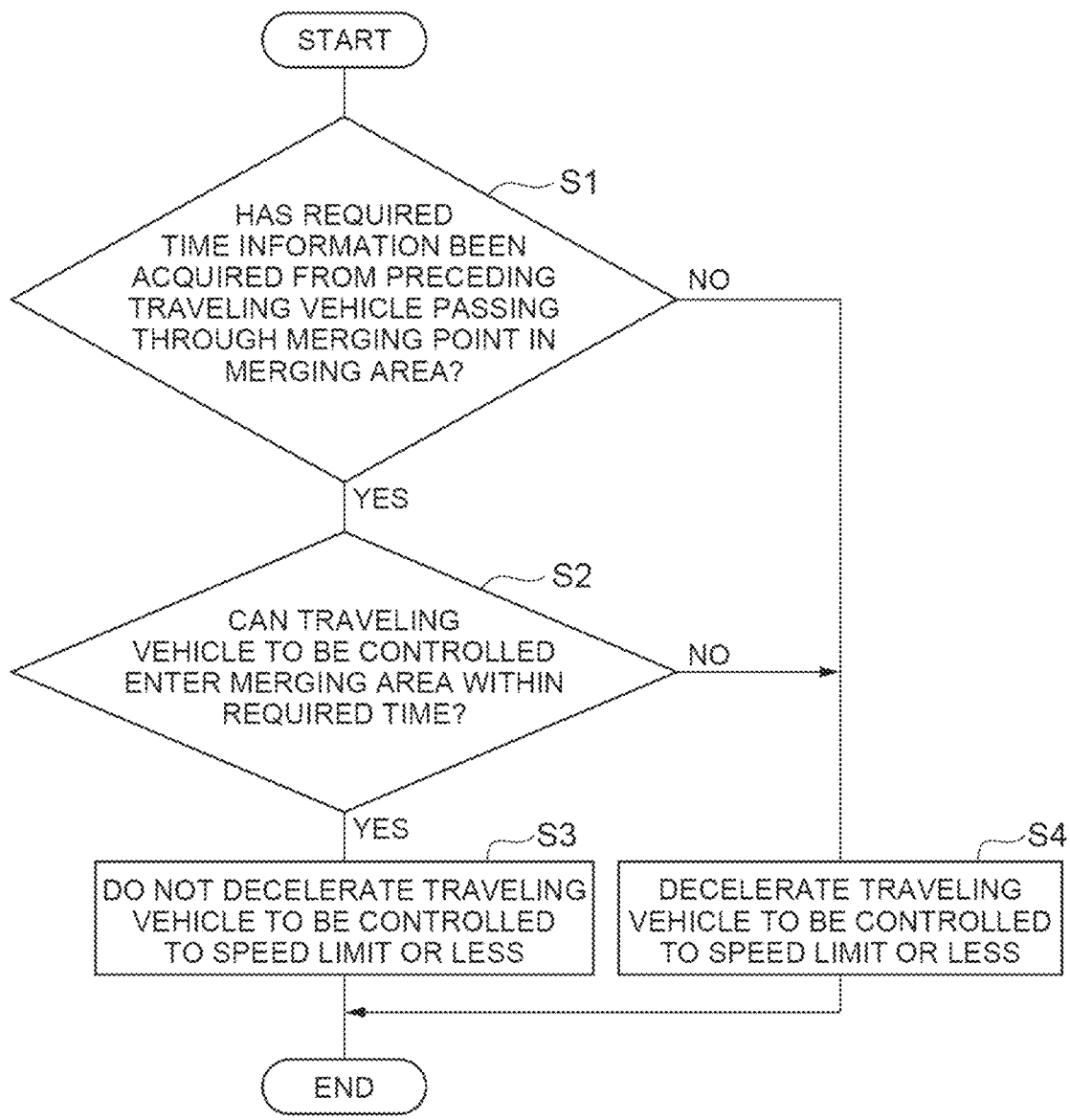
FIG. 4 is a flowchart illustrating an example of travel control of the traveling vehicle performed before entering a merging area.

The following describes an example of travel control of the traveling vehicle 6 in the traveling vehicle system 1. The following description specifically describes, until the traveling vehicle 6 traveling on the travel route 2A enters the merging area G, travel control of the traveling vehicle 6 by the controller 50 using the flowchart in FIG. 4. The traveling vehicle 6 to be travel controlled is also referred to as "traveling vehicle 63 to be controlled."

First, it is determined whether the traveling vehicle 63 to be controlled has acquired the required time information from the preceding traveling vehicle 61 that is scheduled to pass through the merging point P in the merging area G (Step S1). In Step S1 above, it is determined whether the required time information of the preceding traveling vehicle 61 has been acquired as a result of image recognition of the display of the indicator 80 of the preceding traveling vehicle 61 in the taken image of the imager 8. If YES in step S1 above, based on the acquired required time information, it is determined whether the traveling vehicle 63 to be controlled can enter the merging area G within the required time (Step S2).

If YES in Step S2 above, without decelerating the traveling vehicle 63 to be controlled to the speed limit or less, travel control causing the traveling vehicle 63 to be controlled to try to catch up with the preceding traveling vehicle 61 is performed to cause the traveling vehicle 63 to be controlled to enter the merging area G (Step S3). In Step S3 above, the speed of the traveling vehicle 63 to be controlled may be maintained constant or accelerated. In Step S3 above, the traveling vehicle 63 to be controlled may be decelerated to a speed higher than the speed limit. On the other hand, if NO in Step S1 above or NO in step S2 above, the traveling vehicle 63 to be controlled is decelerated to the speed limit or less and is caused to enter the merging area G (Step S4). In the above, the preceding traveling vehicle 61 corresponds to the first traveling vehicle, whereas the traveling vehicle 63 to be controlled corresponds to a second traveling vehicle.

As described above, in the traveling vehicle system 1, until the preceding traveling vehicle 61 traveling on the travel route 2A of the merging area G passes through the merging area G, the blocking control prohibits the opposite traveling vehicle 62 traveling on the travel route 2B different from the preceding traveling vehicle 61 from entering the merging point. In such a prohibited condition, when the traveling vehicle 63 to be controlled traveling on the same travel route 2A as the preceding traveling vehicle 61 can enter the merging area G (that is, when it can enter the merging area G within the required time), there is no risk of the traveling vehicle 63 to be controlled coming into contact with the opposite traveling vehicle 62 at the merging point P, and thus there is no need to decelerate the traveling vehicle 63 to be controlled to the speed limit or less, and thus the traveling vehicle 63 to be controlled can be caused to enter the merging area G while being maintained at a high speed, for example.

Consequently, the traveling vehicle system 1 can prevent the travel time from being extended. It is prevented that the traveling vehicle 63 to be controlled that is about to enter the merging area G is decelerated even when the opposite traveling vehicle 62 is not present, for example, and thus a transport time can be reduced. When the merging area G is narrow (when the distance from the entrance of the merging area G to the stop point T is short), the traveling vehicle 63 to be controlled is required to be decelerated more before entering the merging area G, and thus the present preferred embodiment is particularly effective in such a case.

The traveling vehicle system 1 includes the indicator 80 as the information output provided in the traveling vehicle 6 to output the required time information to the other traveling vehicle 6 following the traveling vehicle 6. The traveling vehicle system 1 includes the imager 8 as the information input provided in the traveling vehicle 6 to receive input of the required time information from the preceding traveling vehicle 61 preceding the traveling vehicle 6. In this case, the required time information can be directly exchanged between the traveling vehicles 6. In addition, even in an environment in which wireless communication or the like is difficult, the required time information can be exchanged between the traveling vehicles 6.

The traveling vehicle system 1, when the traveling vehicle 63 to be controlled cannot enter the merging area G within the required time, decelerates the traveling vehicle 63 to be controlled to the speed limit or less. With this deceleration, when there is a possibility of the opposite traveling vehicle 62 entering the merging point P, taking into account the possibility of stopping the traveling vehicle 63 to be controlled at the stop point T, the traveling vehicle 63 to be controlled can be decelerated to the speed limit or less.

In the traveling vehicle system 1, the merging area G corresponds to the induction line area. In this case, the system can be configured with the induction line area utilized as the merging area G.

Although preferred embodiments have been described above, the aspects of preferred embodiments of the present invention are not limited to the above preferred embodiments. Various changes can be made without departing from the gist of the present invention.

In the above preferred embodiments, the indicator 80 is used as the information output, but other devices such as transmitters using wireless communication may be used so long as information can be output. The imager 8 is used as the information input, but other devices such as receivers may be used so long as information can be input. The imager 8 is not limited to a particular structure or device, and imagers having a distance measurement function, such as stereo cameras or TOF cameras, may be used. In the above preferred embodiments and modifications, the overhead traveling vehicle is described as an example of the traveling vehicle. Other examples of the traveling vehicle include unmanned traveling vehicles and stacker cranes traveling on tracks laid on the ground or bases, or travel paths installed with lane markers.

In the above preferred embodiments and modifications, examples in which the controller 50 configured or programmed to control the traveling vehicle 6 is provided in the main body 7 of each individual traveling vehicle 6 are described, but it may be separated from the main body 7 and placed at a position (the controller 60, for example) communicable by wired communication or wireless communication. In such a case, the controller 50 may be configured or programmed to be able to collectively control the traveling vehicles 6 instead of being provided for each of the traveling vehicles 6.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A traveling vehicle system to perform control in a merging area including a merging point of a plurality of travel routes, until a traveling vehicle traveling on one travel route passes through the merging area, to stop a traveling vehicle traveling on another travel route at a stop point before the merging point, the traveling vehicle system comprising:
   a controller configured or programmed to calculate a required time for a first traveling vehicle passing through the merging point in the merging area to pass through the merging area;
   an information output provided in the first traveling vehicle to output information on the required time to a second traveling vehicle following the first traveling vehicle, the information output including a display to output the required time to the second traveling vehicle by displaying information on the required time; and
   an information input provided in the second traveling vehicle to receive input of the information on the required time from the first traveling vehicle preceding the second traveling vehicle, the information input including a camera to receive an input of the required time from the first traveling vehicle by imaging the required time displayed on the display of the first traveling vehicle; wherein
   the controller is configured or programmed to, when the second traveling vehicle following the first traveling vehicle and traveling on the same travel route as the first traveling vehicle outside the merging area is capable of entering the merging area within the required time, cause the second traveling vehicle to enter the merging area without decelerating the second traveling vehicle to a speed limit or less enabling stopping at the stop point.

2. The traveling vehicle system according to claim 1, wherein the second traveling vehicle is decelerated to the speed limit or less when the second traveling vehicle is not capable of entering the merging area within the required time.

3. The traveling vehicle system according to claim 1, wherein the merging area corresponds to an induction line area provided with induction lines along the travel routes around the merging point.

* * * * *